(12) United States Patent
Chigapov et al.

(10) Patent No.: US 7,820,588 B2
(45) Date of Patent: Oct. 26, 2010

(54) CARBON MONOXIDE CATALYST

(75) Inventors: Albert Chigapov, Aachen (DE);
Brendan Carberry, Aachen (DE);
Alexander Susdorf, Freiburg (DE)

(73) Assignees: Ford Global Technologies, LLC,
Dearborn, MI (US);
Fraunhofer-Gesellschaft, Munich (DE)

( * ) Notice: Subject to any disclaimer, the term of this patent is extended or adjusted under 35 U.S.C. 154(b) by 638 days.

(21) Appl. No.: 11/565,699

(22) Filed: Dec. 1, 2006

(65) Prior Publication Data
US 2007/0129247 A1   Jun. 7, 2007

(30) Foreign Application Priority Data
Dec. 2, 2005   (DE)   ........................ 10 2005 057 696

(51) Int. Cl.
B01J 23/00   (2006.01)
B01J 21/00   (2006.01)
B01J 20/00   (2006.01)
(52) U.S. Cl. ............................ 502/326; 502/74; 502/87; 502/213; 502/339; 502/349
(58) Field of Classification Search ................. 502/260, 502/261, 162, 302, 326, 332, 334, 339, 349, 502/355, 415, 439, 74, 87, 213
See application file for complete search history.

(56) References Cited

U.S. PATENT DOCUMENTS

| 3,839,224 | A | * | 10/1974 | Yonehara et al. ............... 502/66 |
| 4,091,072 | A | * | 5/1978 | McArthur ................. 423/213.5 |
| 4,585,798 | A | * | 4/1986 | Beuther et al. ............... 518/715 |
| 4,973,768 | A | * | 11/1990 | Cordier et al. ............... 568/814 |
| 4,983,230 | A | * | 1/1991 | Overfelt et al. ............. 148/300 |
| 5,061,464 | A | * | 10/1991 | Cordonna et al. ........ 423/213.5 |
| 5,068,214 | A | * | 11/1991 | Cordier et al. ............... 502/185 |
| 5,106,703 | A | * | 4/1992 | Carcia ......................... 428/635 |
| 5,178,971 | A | * | 1/1993 | Itoh et al. ..................... 429/40 |
| 5,294,739 | A | * | 3/1994 | Kraushaar-Czarnetzki et al. .......................... 562/543 |
| 5,305,300 | A | * | 4/1994 | Ohta et al. ................ 369/275.2 |
| 5,563,000 | A | * | 10/1996 | Hatwar et al. ............. 428/819.1 |
| 5,783,301 | A | * | 7/1998 | Hatwar et al. ............... 428/332 |
| 5,834,085 | A | * | 11/1998 | Lairson et al. ........... 428/828.1 |
| 5,837,386 | A | * | 11/1998 | Miller et al. ................. 428/623 |
| 5,851,948 | A | * | 12/1998 | Chuang et al. .............. 502/314 |
| 5,894,068 | A | * | 4/1999 | Kharas et al. ............... 502/327 |
| 5,954,927 | A | * | 9/1999 | Kobayashi et al. ....... 204/192.2 |
| 6,022,630 | A | * | 2/2000 | Miller et al. ................. 428/611 |
| 6,022,826 | A | * | 2/2000 | Deeba et al. ................ 502/325 |
| 6,074,973 | A | * | 6/2000 | Lampert et al. ............... 502/60 |
| 6,087,295 | A | * | 7/2000 | Kharas et al. ............... 502/300 |
| RE37,663 | E | * | 4/2002 | Golunski et al. ............ 502/339 |

(Continued)

*Primary Examiner*—Cam N Nguyen
(74) *Attorney, Agent, or Firm*—Damian Porcari

(57) ABSTRACT

The invention relates to a catalyst for the oxidation of carbon monoxide (CO) at low temperatures, which is a catalytically active composition based on platinum and cobalt. The catalyst can be used in the removal of CO from hydrogen-rich gas for fuel cell technology in order to avoid poisoning the electrodes with CO. Further fields of application relate to the automobile sector, and in particular, to the effective removal of CO during cold starting of a diesel or petrol engine and also to air purification systems for quality control of air in interior spaces, e.g., the removal of CO in a tunnel, an underground railway, multi-story car parks or submarines.

2 Claims, 16 Drawing Sheets

U.S. PATENT DOCUMENTS

| | | | |
|---|---|---|---|
| 6,685,899 B1 * | 2/2004 | Park | 423/213.5 |
| 6,784,135 B2 * | 8/2004 | Scholten et al. | 502/245 |
| 6,821,412 B1 * | 11/2004 | Fujukawa et al. | 208/210 |
| 6,835,690 B2 * | 12/2004 | Van Berge et al. | 502/328 |
| 6,846,773 B1 * | 1/2005 | Yokoyama et al. | 502/339 |
| 7,390,768 B2 * | 6/2008 | Jordan et al. | 502/326 |
| 7,419,741 B2 * | 9/2008 | Vernstrom et al. | 429/44 |
| 2002/0131915 A1 * | 9/2002 | Shore et al. | 422/177 |
| 2002/0147103 A1 * | 10/2002 | Ruettinger et al. | 502/66 |
| 2003/0054953 A1 * | 3/2003 | He et al. | 502/302 |

\* cited by examiner

CARBON MONOXIDE CATALYST

FIELD OF THE INVENTION

The invention relates to a catalyst for the oxidation of carbon monoxide (CO) at low temperatures, which is a catalytically active composition based on platinum and cobalt. The catalyst can be used in the removal of CO from hydrogen-rich gas for fuel cell technology in order to avoid poisoning the electrodes with CO. Further fields of application relate to the automobile sector in particular, to the effective removal of CO during cold starting of a diesel or petrol engine and also to air purification systems for quality control of air in interior spaces, the removal of CO in a tunnel, an underground railway, multi-story car parks or submarines.

BACKGROUND OF THE INVENTION

In recent years, environmental protection guidelines in the United States and Europe have encouraged the development of alternative energy sources for engines using hydrogen as fuel. The most modern process, having the highest efficiency for in-situ production of hydrogen, is reforming alcohols or hydrocarbons, in particular methane and diesel fuel, in combination with a water gas shift reaction (WGSR) and the selective oxidation of CO (SelOx), followed by energy generation in fuel cells. Fuel cells are significantly more energy efficient than internal combustion engines. Thus, power stations using fuel cells are able to achieve a system efficiency of 70-80%, compared to 30-37% for combustion. In the transport sector, polymer membrane fuel cells (PEMFCs) or high-temperature fuel cells (SOFCs) achieve an efficiency of 40-50%, compared to internal combustion engines (IC engines) 10 which have a present-day efficiency of 20-35%.

Polymer membrane fuel cells are compact, have a high power density and can be operated at low temperatures. However, they suffer from electrode poisoning (anodic catalyst Pt, Pt-Ru) by carbon monoxide, if the concentration of carbon monoxide is above 20 ppm. It is difficult to completely eliminate CO after reforming and the water gas shift reaction; thus, a need exists for CO removal from hydrogen-containing mixtures.

The method with the best prospects is the oxidation of CO by addition of small amounts of oxygen, but this requires highly selective catalysts that can oxidize CO without the simultaneous oxidation of hydrogen at the lowest temperature possible.

Many catalysts for the selective oxidation of CO (known as preferential CO oxidation in an excess of hydrogen, "PROX") are known. These include systems based on gold and silver catalysts. However, these systems have the disadvantage that they have both low thermal stability and low stability under reaction conditions, which results in partial deactivation of the catalyst. A further disadvantage of these systems is that they are quite sensitive to moisture and $CO_2$.

Further known catalysts are those based on copper; these systems have only a low activity with respect to the oxidation of CO below 200° C. in the presence of hydrogen. These systems, too, are very sensitive to water and in particular, $CO_2$.

W. S. Epling, P. K. Cheekatamarla and A. M. Lane, Chemical Engineering Journal 93 (2003) 61-68, disclose a platinum- and cobalt-based catalyst on a support structure composed of $TiO_2$, which is used for the selective oxidation of CO (PROX). A high catalyst activity was found here, but it was not possible to achieve the complete removal of carbon monoxide under reaction conditions for polymer membrane fuel cells, which can be attributed to the low selectivity of CO.

SUMMARY OF THE INVENTION

The invention includes a catalyst and process for producing a catalyst, in which a support structure is co-impregnated in an acidic medium. The acidic medium comprises at least one platinum precursor and at least one cobalt precursor, which function as catalytic components. The co-impregnation is then followed by drying and calcination of the support structure.

Tetrammineplatinum(II) nitrate and/or tetramminelatinum(II) nitrate are preferably used as platinum precursors. Cobalt(IV) nitrate is preferably used as a cobalt precursor. Particularly good results are obtained when an aqueous solution containing tartaric acid and/or citric acid and/or malic acid is used as the acidic medium.

The material of the support structure is, in principle, not subject to any restrictions and includes silicon dioxide ($SiO_2$), zirconium dioxide ($ZrO_2$), aluminum oxide ($Al_2O_3$), cerium oxide ($CeO_2$) and mixtures thereof. Silicon dioxide and zirconium dioxide were used because they display the highest activity and selectivity.

DETAILED DESCRIPTION OF THE PREFERRED EMBODIMENTS

The subject matter of the invention will be explained in more detail with the aid of the following figures and examples, without restricting the scope of the invention to the specific embodiments indicated here. The drawings include fractional numbers, with both a "," and "." as placeholders.

Figure 1:
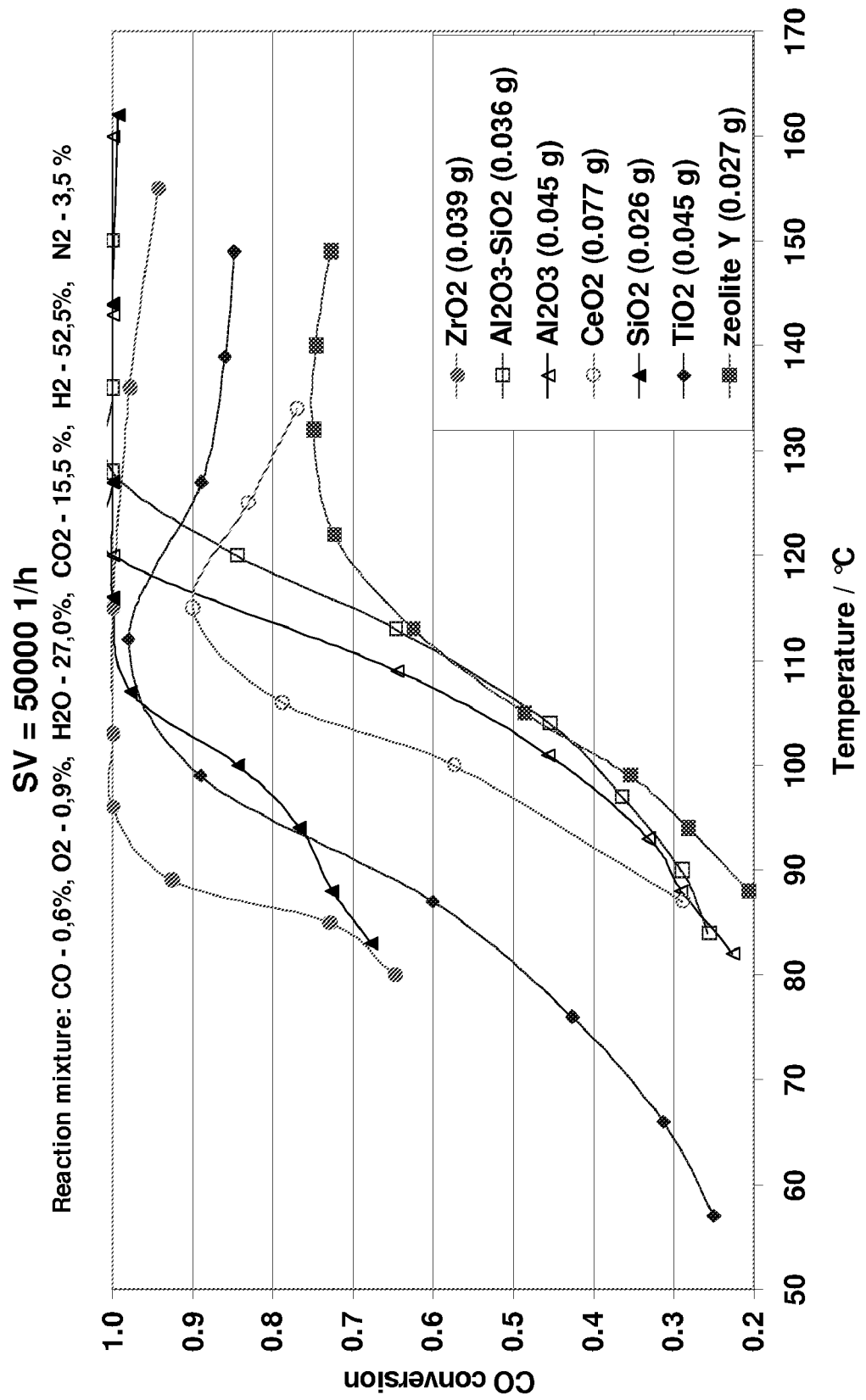
FIG. 1 is a graph comparing a series of support materials laden with 2% by weight of platinum and 4% by weight of cobalt for the selective oxidation of CO (PROX).

FIG. 1 shows, with the aid of a graph, a comparison of various support materials laden with 2% by weight of platinum and 4% by weight of cobalt for the selective oxidation of CO (PROX).

Figure 2:
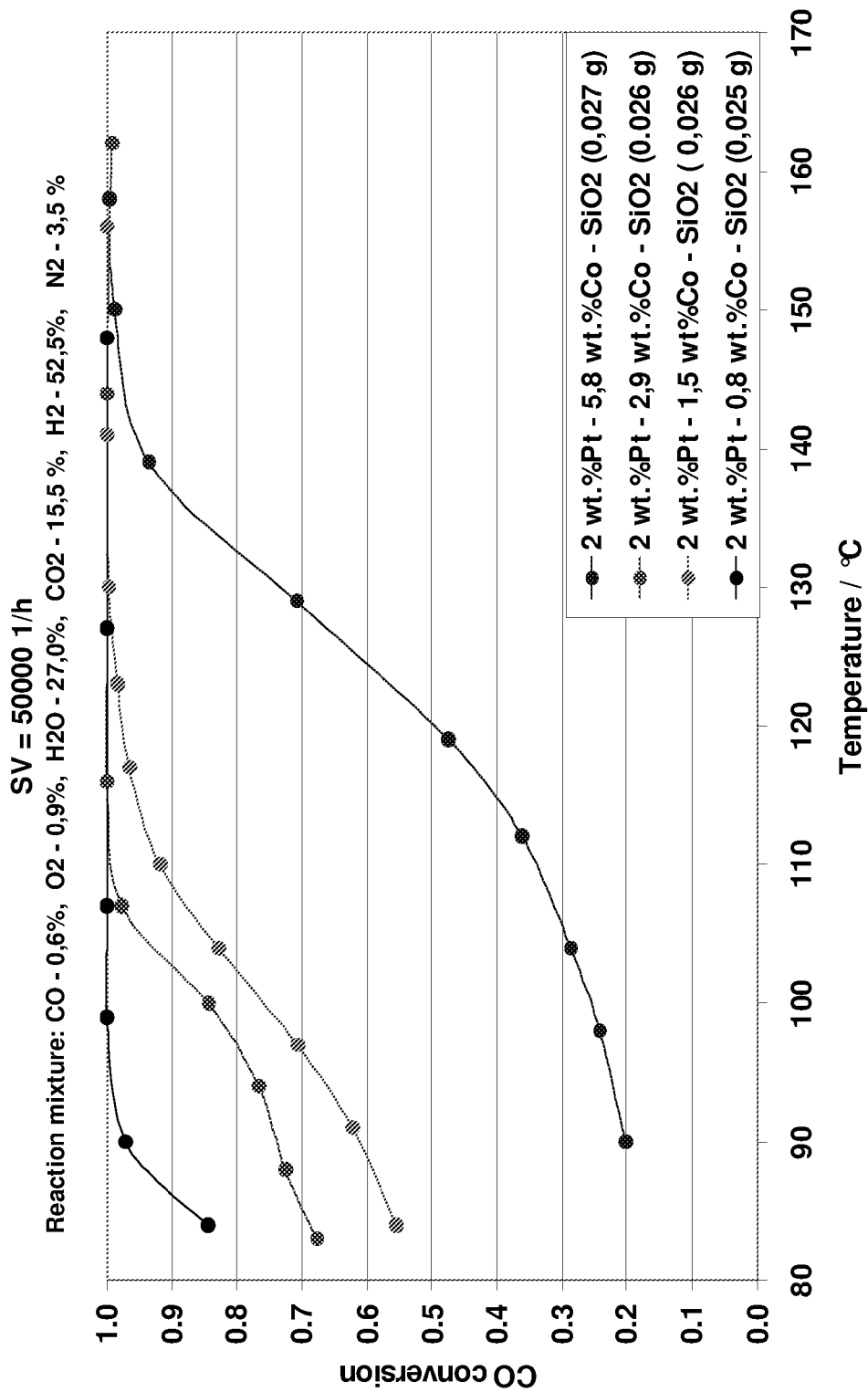
FIG. 2 is a graph that indicates the dependence of the CO conversion on the Pt/Co ratio at a constant Pt loading.

FIG. 2 shows a graph that indicates the dependence of the CO conversion on the Pt/Co ratio at a constant Pt loading in PROX.

Figure 3A:
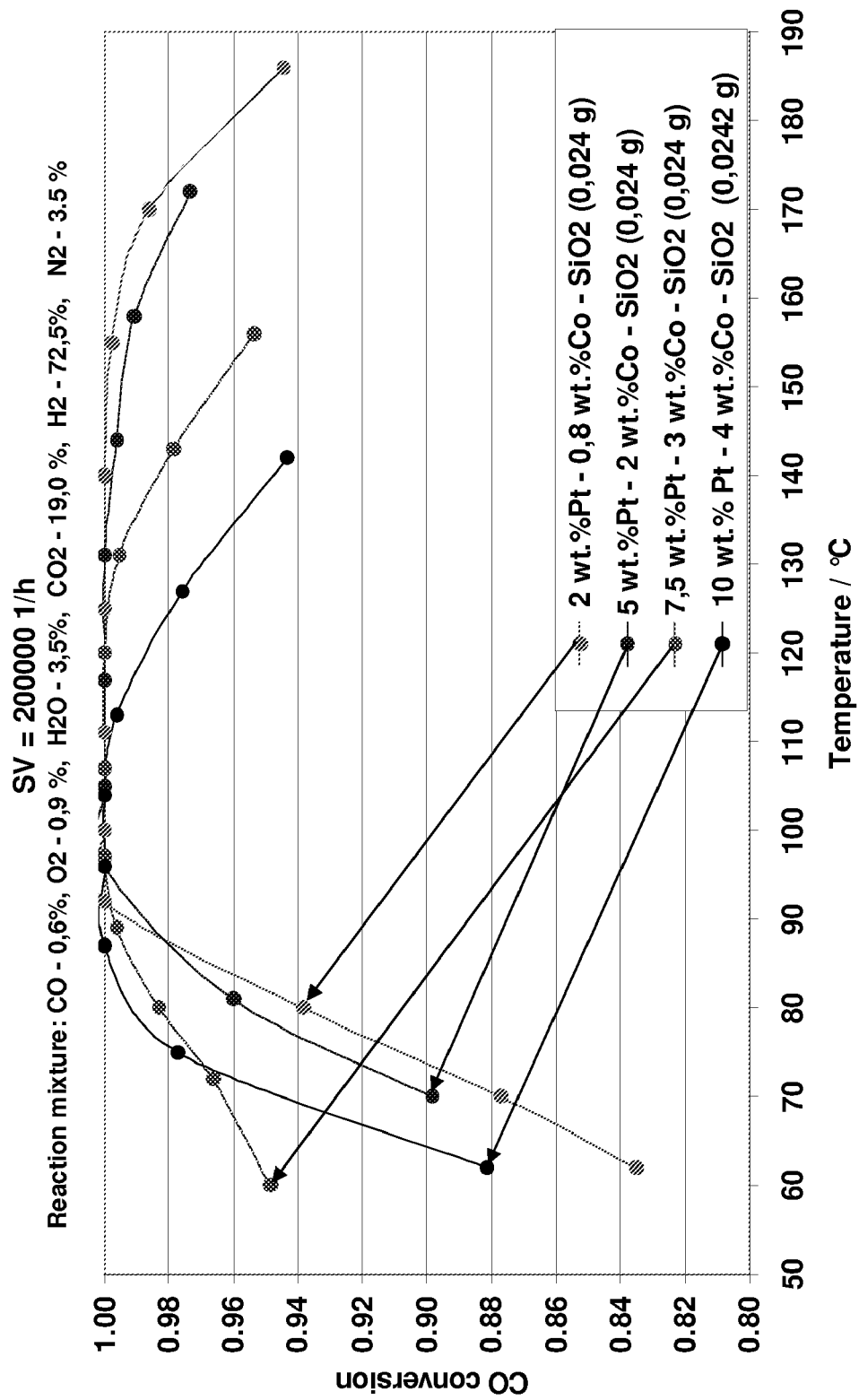
FIGS. 3a and 3b are graphs of the activity of Pt/Co catalysts on $SiO_2$ and MCM-$SiO_2$ support structures.
Figure 3B:
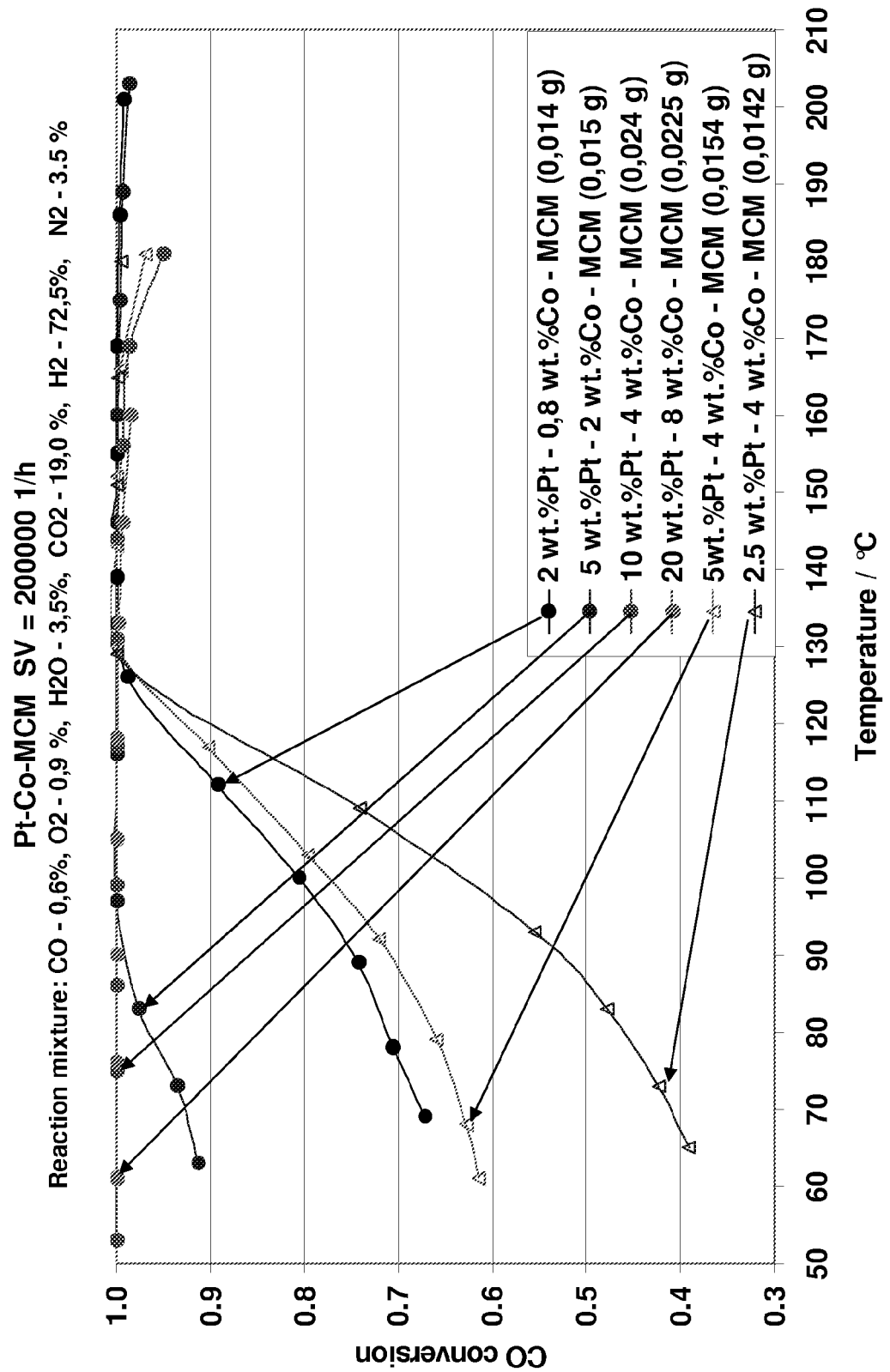

FIGS. 3a and 3b shows the relative activities of Pt/Co catalyst compositions on $SiO_2$ and MCM-$SiO_2$ support structures under PROX conditions at the indicated temperatures.

Figure 4:
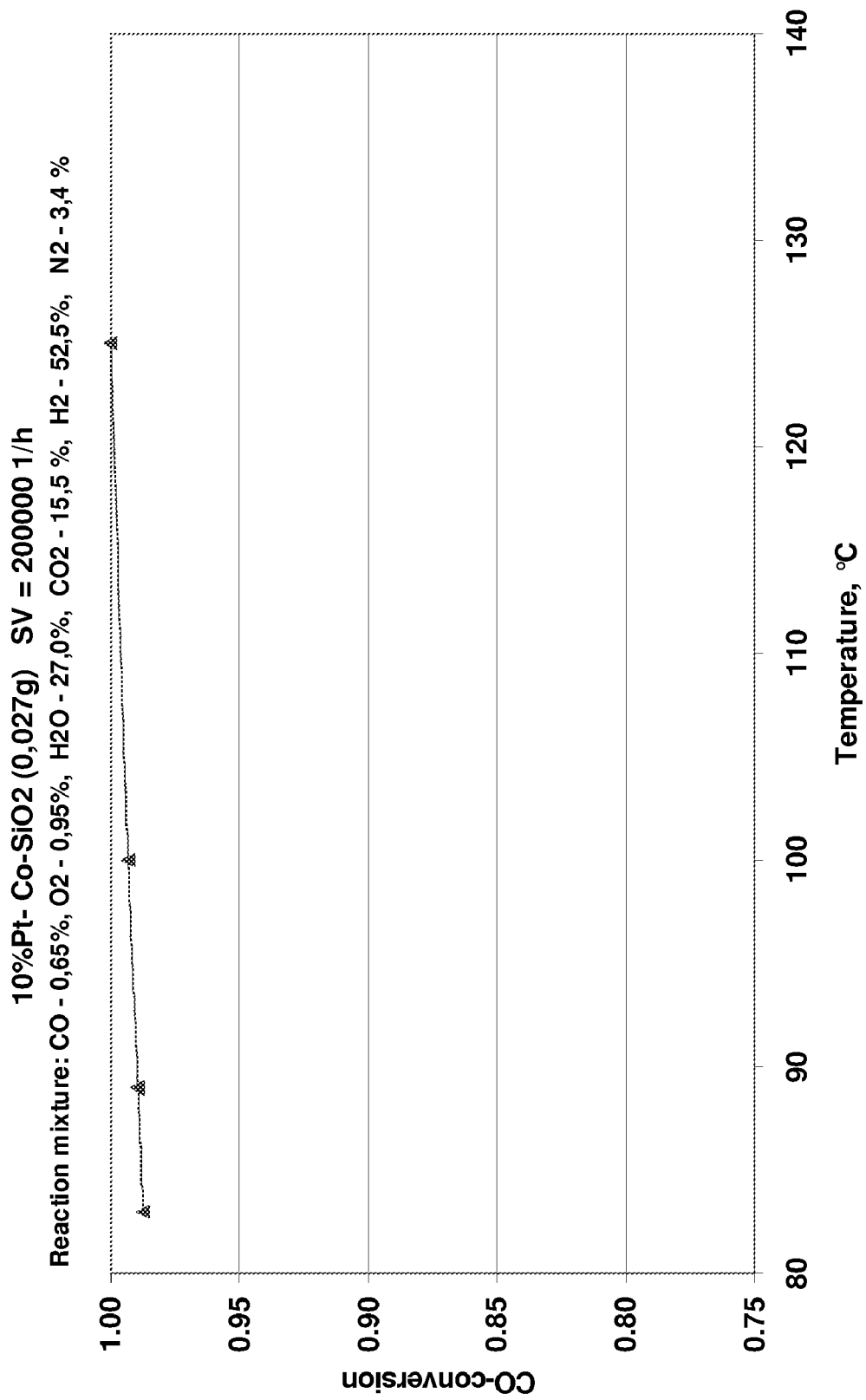
FIG. 4 is a graph of the activity of a catalyst system, based on 10% by weight of platinum and 4% by weight of cobalt on an $SiO_2$ support structure.

FIG. 4 shows the activity of a catalyst system based on 10% by weight of platinum and 4% by weight of cobalt on an $SiO_2$ support, structure, produced by co-impregnation with $H_2Pt(OH)_6$, cobalt nitrate and nitric acid. The activity was determined under PROX conditions.

Figure 5:
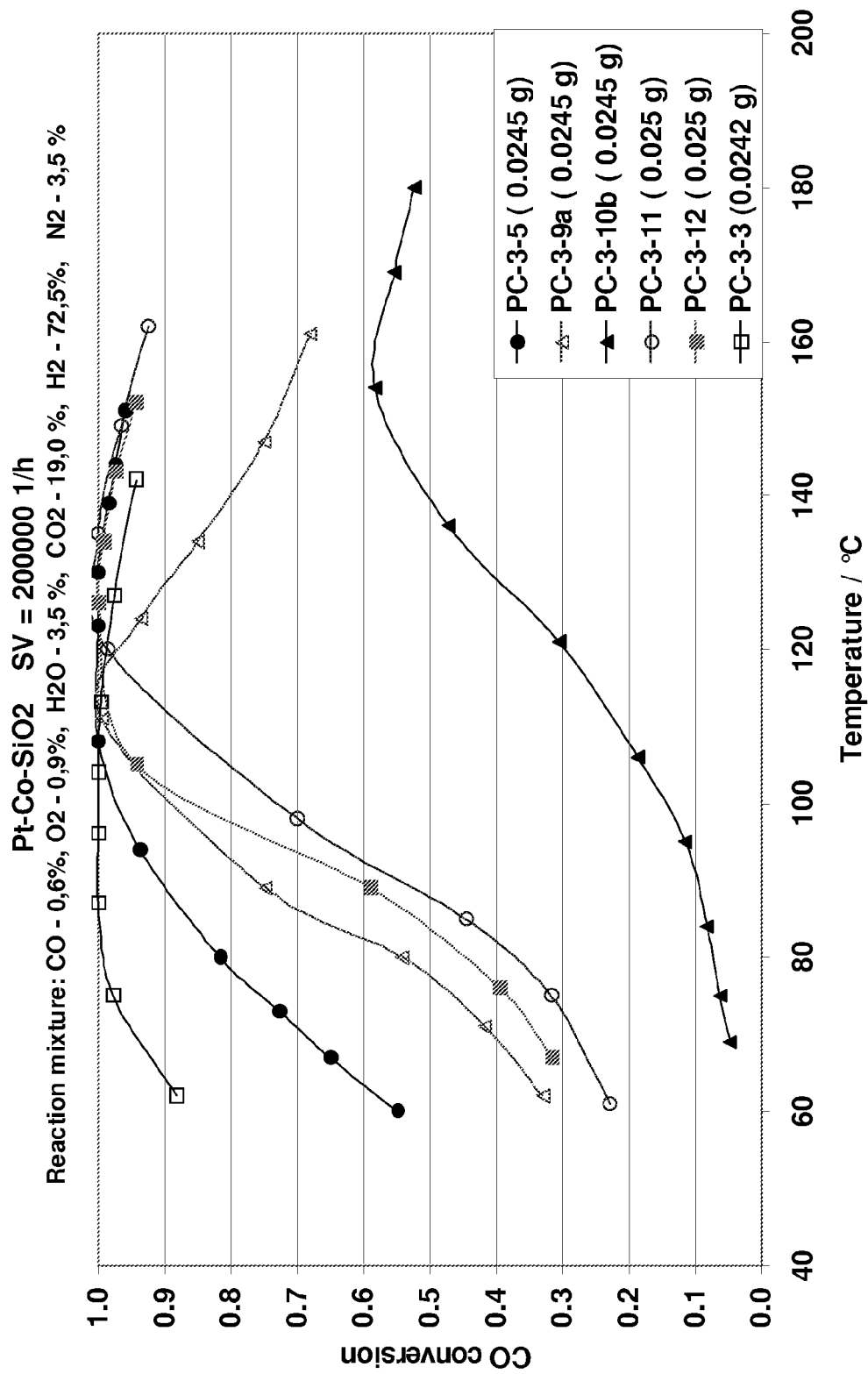
FIG. 5 is a graph of 10% by weight of Pt and 4% by weight of Co/$SiO_2$ which were prepared by different processes.

FIG. 5 shows a comparison of the activity under PROX conditions of Pt/Co catalysts (10% by weight of Pt, 4% by weight of Co on a $SiO_2$ substrate), which have been produced by various processes. The abbreviations used here have the following meanings:

PC-3-3: Impregnation with $Pt(NH_3)_4(NO_3)_2$, $Co(NO_3)_2$ and citric acid;

PC-3-5: $Co(NO_3)_2$ in ammonia→calcined at 400° C.→Pt$(NHO_3)_4(OH)_2$;

PC-3-9a: Impregnation with $H_2PtCl_6$→calcined at 400° C.→$Co(NO_3)_2$ in ammonia;

PC-3-10b: Impregnation with $H_2PtCl_6$ and citric acid→calcined at 400° C.→$Co(NO_3)_2$ and citric acid;

PC-3-11: Impregnation with $Co(NO_3)_2$→calcined at 400° C.→$Pt(NH_3)_4(NO_3)_2$; and PC-3-12: Impregnation with $Pt(NH_3)_4(OH)_2$→calcined at 400° C.→$Co(NO_3)_2$ in ammonia.

Figure 6:
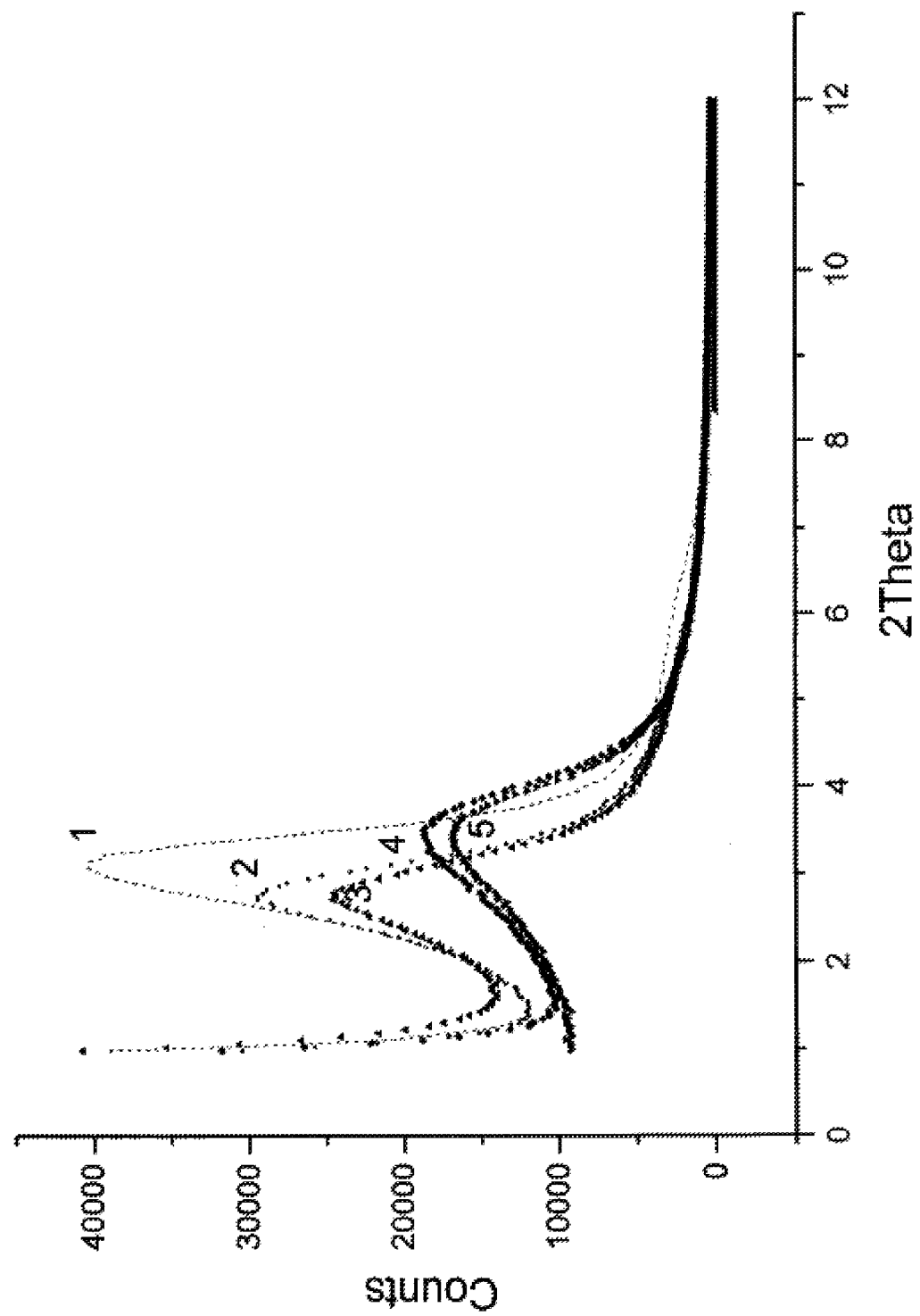
FIG. 6 is an XRD spectrum of MCM materials that have been produced using DDDA-Br as surfactant at various molar ratios of Si/surfactant.

FIG. 6 shows an XRD spectrum of MCM materials (ordered mesoporous materials), which have been produced using DDDA-Br (didecyldimethylammonium bromide) as a surfactant at various molar ratios of Si/surfactant. The abbreviations used here have the following meanings:

1:DDDA-Br/Si=0.8;
2:DDDA-Br/Si=0.5;
3:DDDA-Br/Si=0.3;
4:DDDA-Br/Si=0.1; and
5:DDDA-Br/Si=1.2.

Figure 7:
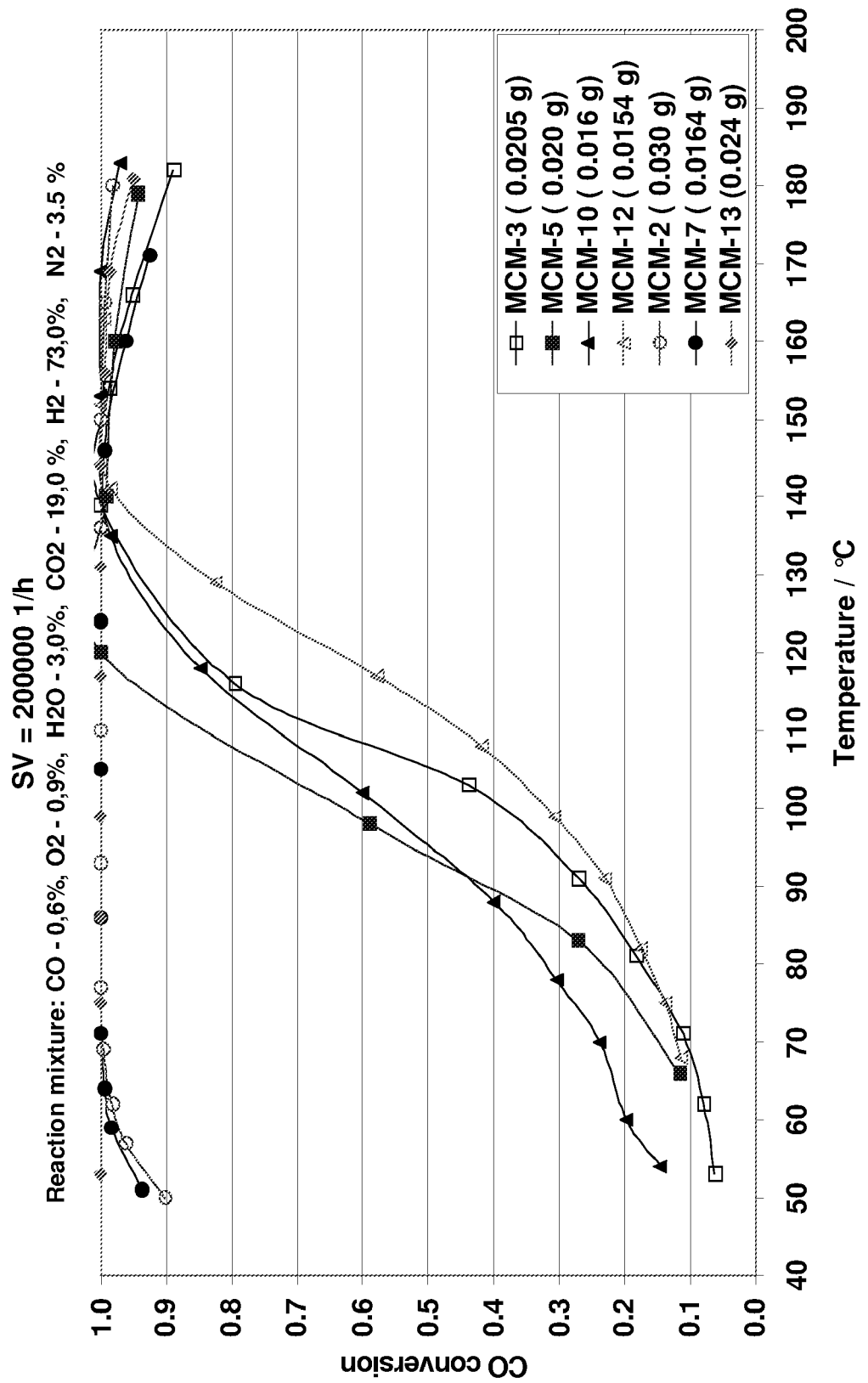
FIG. 7 is a graph of the activity of Pt-Co-MCM catalysts, which were prepared by different processes.

FIG. 7 shows activity of Pt-Co-MCM catalysts under PROX conditions, which were produced under different conditions. The abbreviations used here have the following meanings:

MCM-2: 15% Pt, 6% Co, using $H_2Pt(OH)_6$, nitric acid+ citric acid, cobalt nitrate;

MCM-3: 10% Pt, 4% Co, using $H_2PtCl_6$, citric acid and cobalt nitrate;

MCM-5: 20% Pt, 6.7% Co, using citric acid→calcined at 550° C.→addition of cobalt nitrate;

MCM-7: 15% Pt, 6% Co, using $H_2Pt(OH)_6$, nitric acid+ citric acid, and cobalt nitrate;

MCM-10: 10% Pt, 4% Co, using tetrammineplatinum nitrate and cobalt nitrate;

MCM-12: 15% Pt, 6.7% Co, using tetrammineplatinum nitrate, cobalt nitrate and also ammonia; and MCM-13: 10% Pt, 4% Co, using tetrammineplatinum nitrate, cobalt nitrate and citric acid, with the molar ratio of citric acid/Pt+Co being 1.2.

Figure 8:
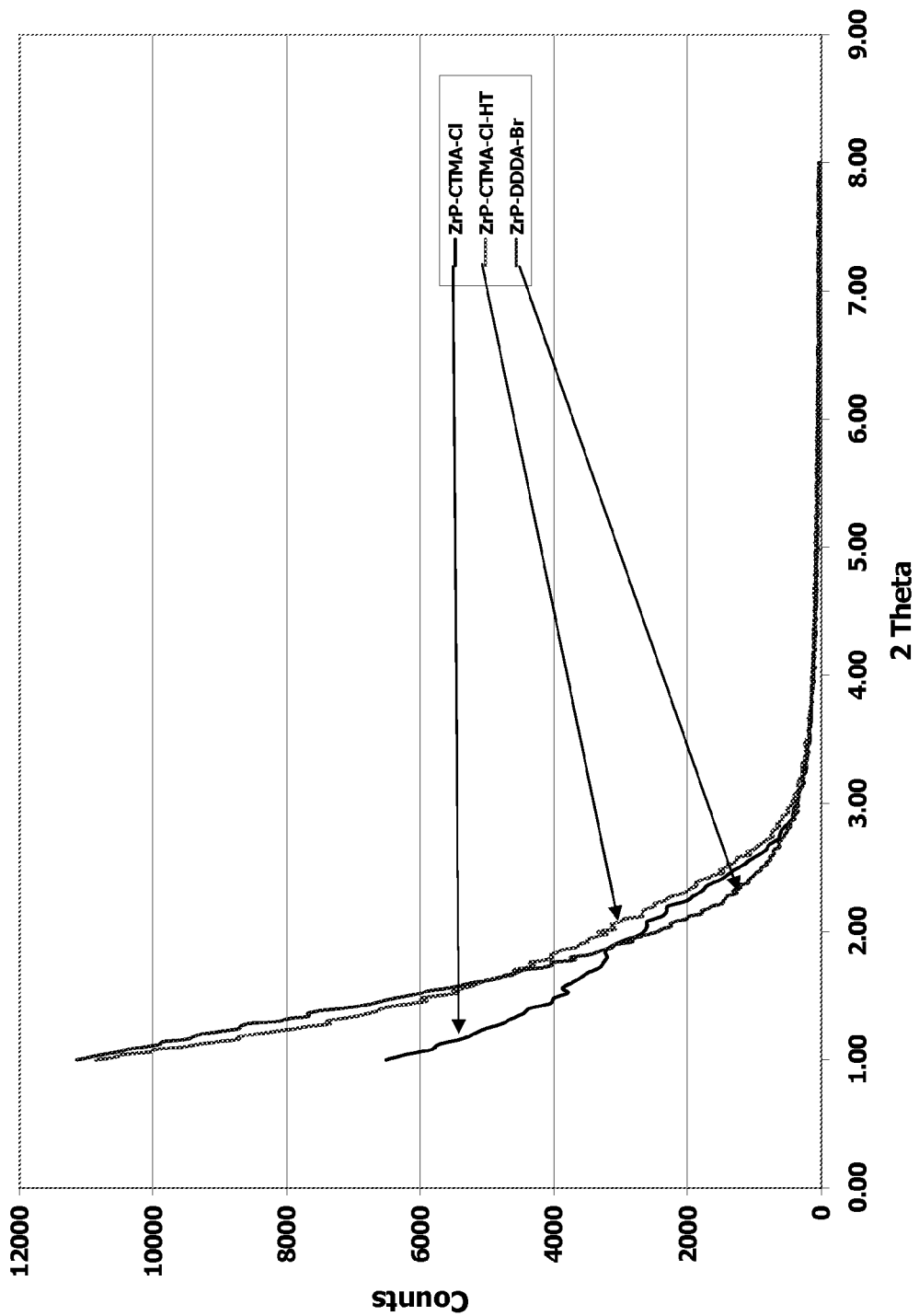
FIG. 8 is the XRD spectra of zirconium phosphate, which has been treated with cetyltrimethylammonium chloride (ZrP-CTMA-Cl) and didecyldimethylammonium bromide (ZrP-DDDA-Br).

FIG. 8 shows XRD spectra of zirconium phosphate, which has been treated with cetyltrimethylammonium chloride (ZrP-CTMA-Cl) and didecyldimethylammonium bromide (ZrP-DDDA-Br), with the molar ratio of Zr/P/surfactant being 2:1:1 for all samples.

Figure 9:
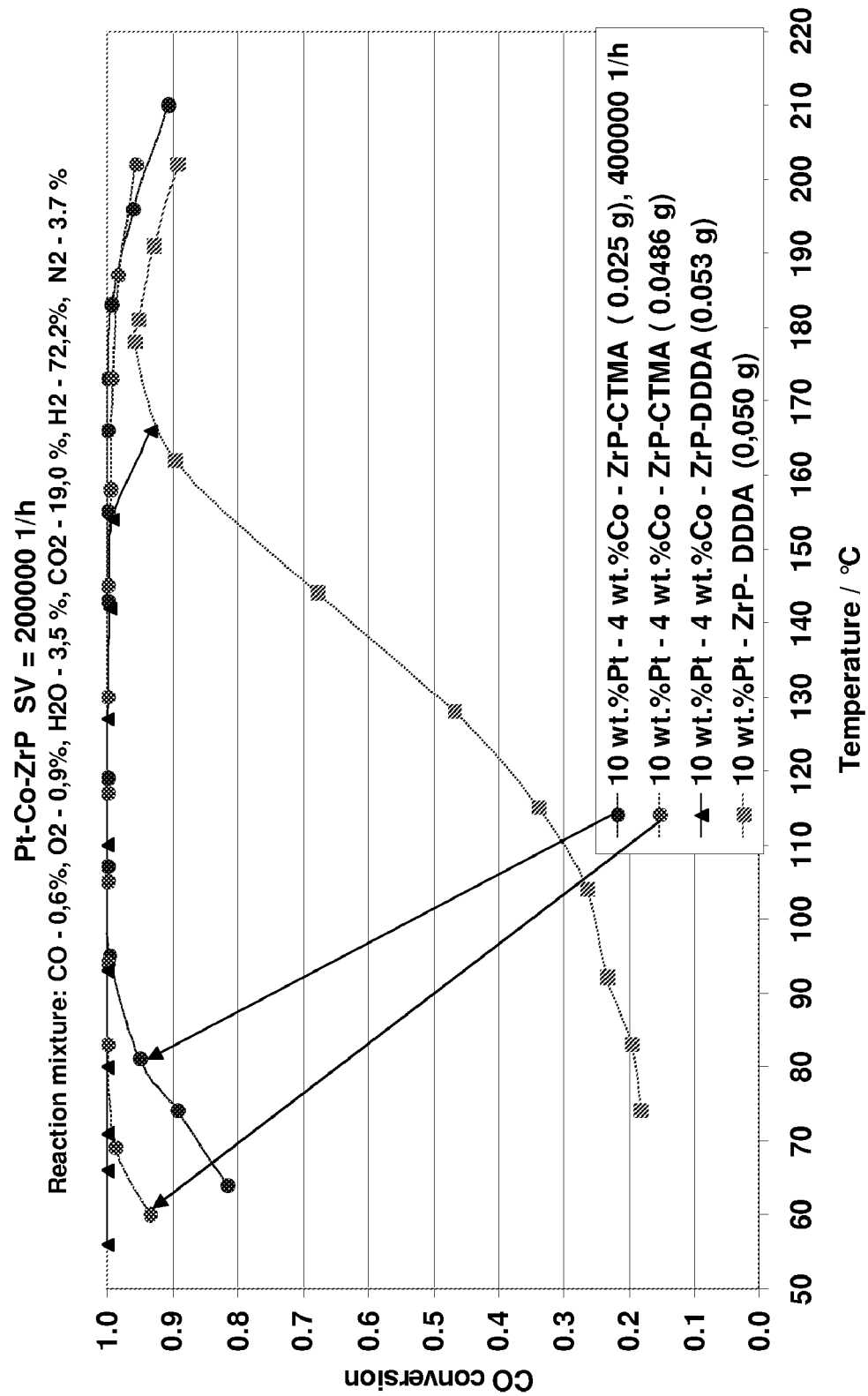
FIG. 9 is a graph of the activity of catalysts on a zirconium phosphate support in the oxidation of CO.

FIG. 9 shows a comparison of catalysts on a zirconium phosphate support in the oxidation of CO under PROX conditions at low temperatures, comparing catalysts with platinum alone and catalysts with both platinum and cobalt.

Figure 10A:
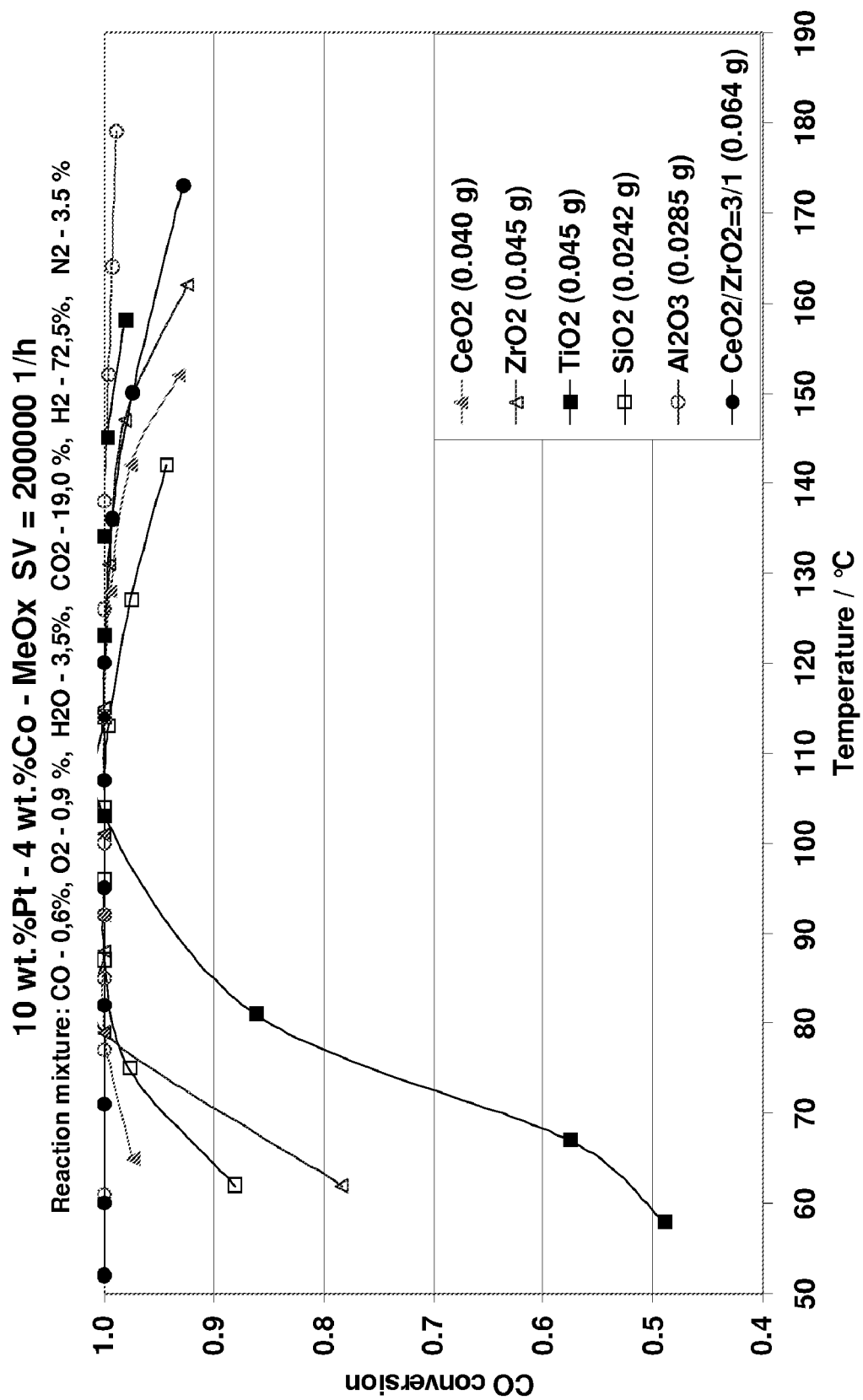
FIGS. 10a and 10b are graphs of the activity of a catalyst on different support structures.
Figure 10B:
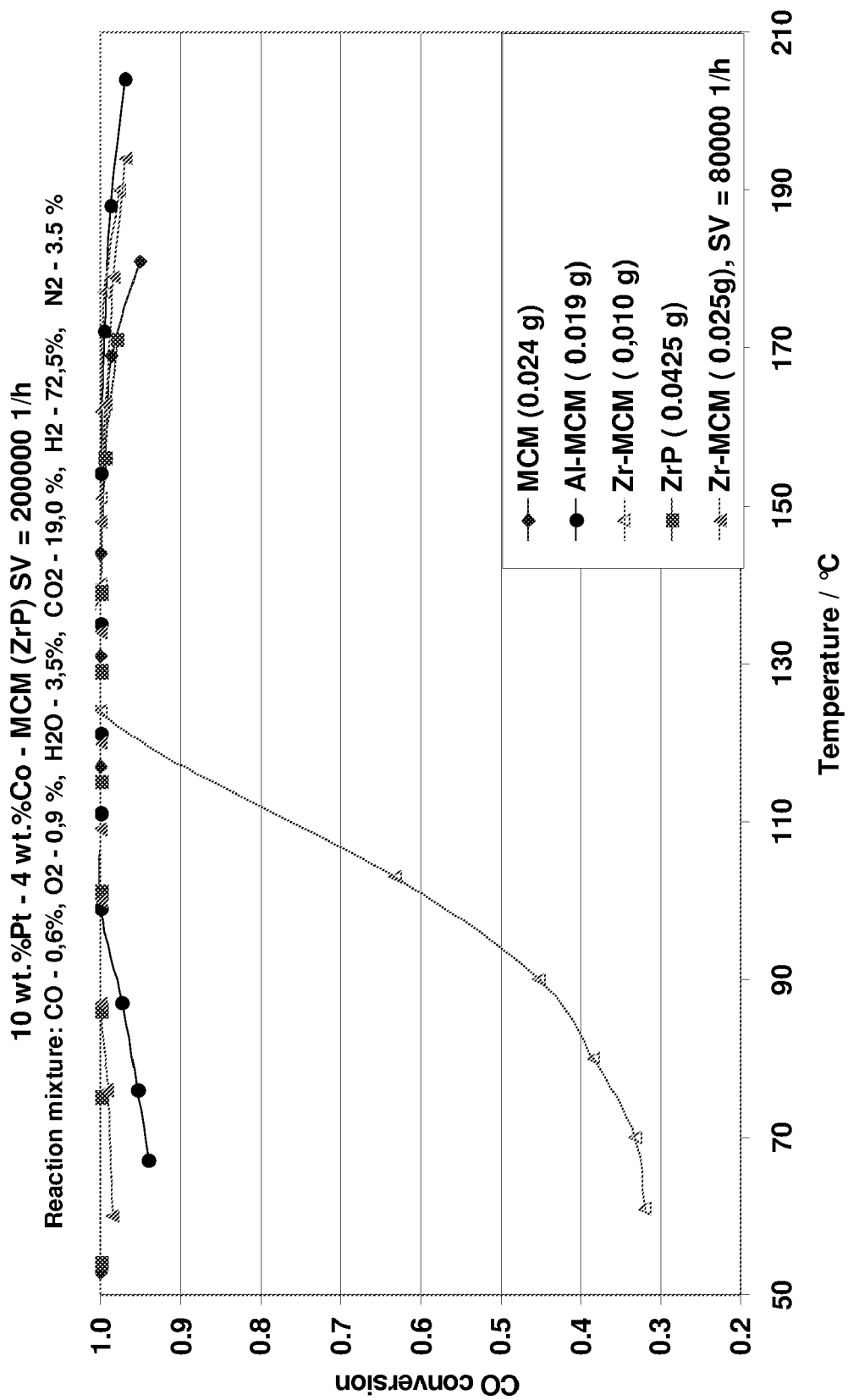

FIGS. 10a and 10b show a graph of catalysts based on different support structures for the oxidation of CO under PROX conditions at low temperatures.

Figure 11:
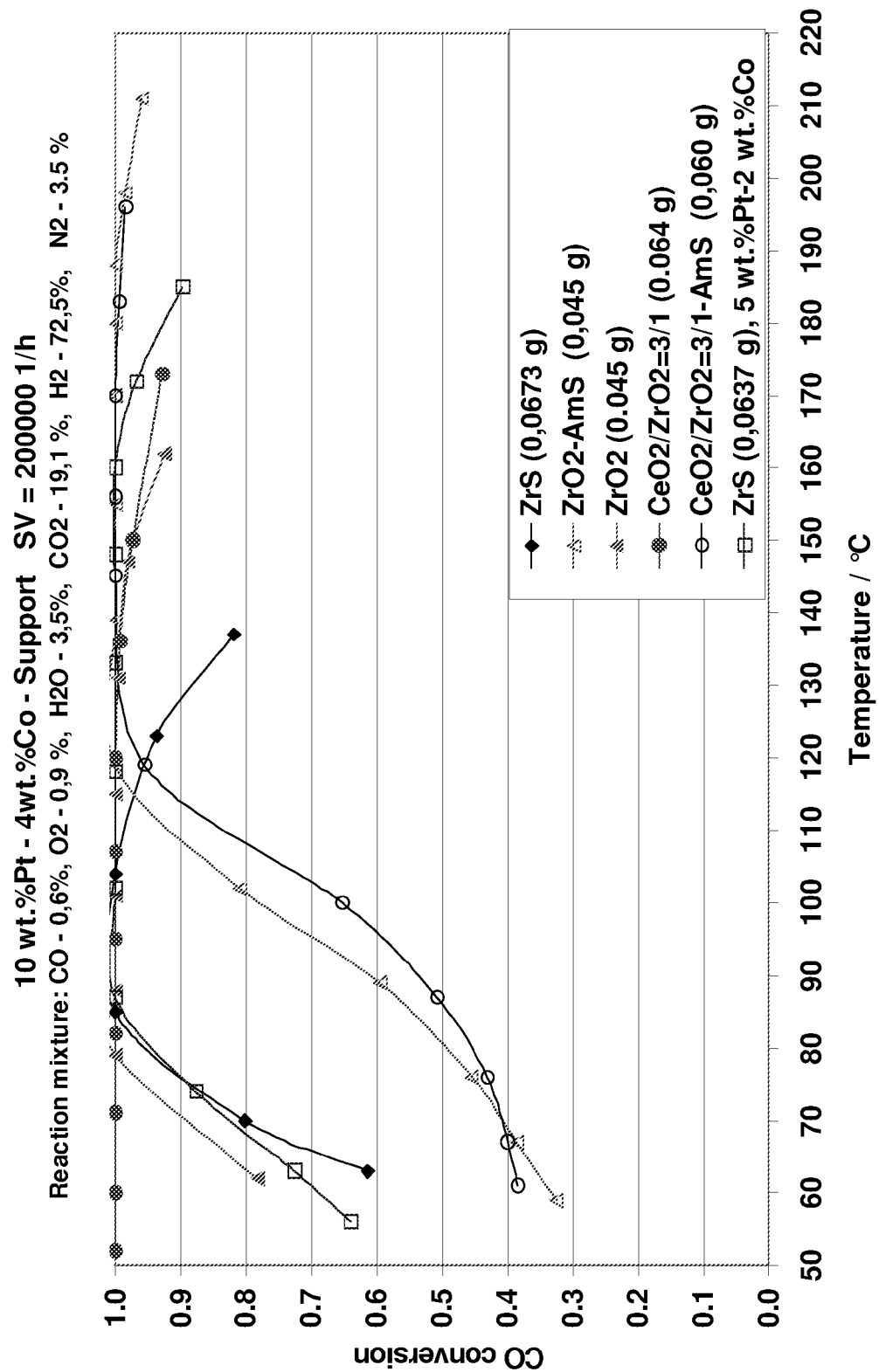
FIG. 11 is a graph of the activity of sulfated and unsulfated Pt-Co catalysts on support structures comprising zirconium dioxide or cerium dioxide/zirconium dioxide.

FIG. 11 shows a graph of the activity in the oxidation of CO under PROX conditions at low temperatures of sulfated and unsulfated Pt-Co catalysts on support structures, comprising zirconium dioxide or cerium dioxide/zirconium dioxide.

Figure 12A:
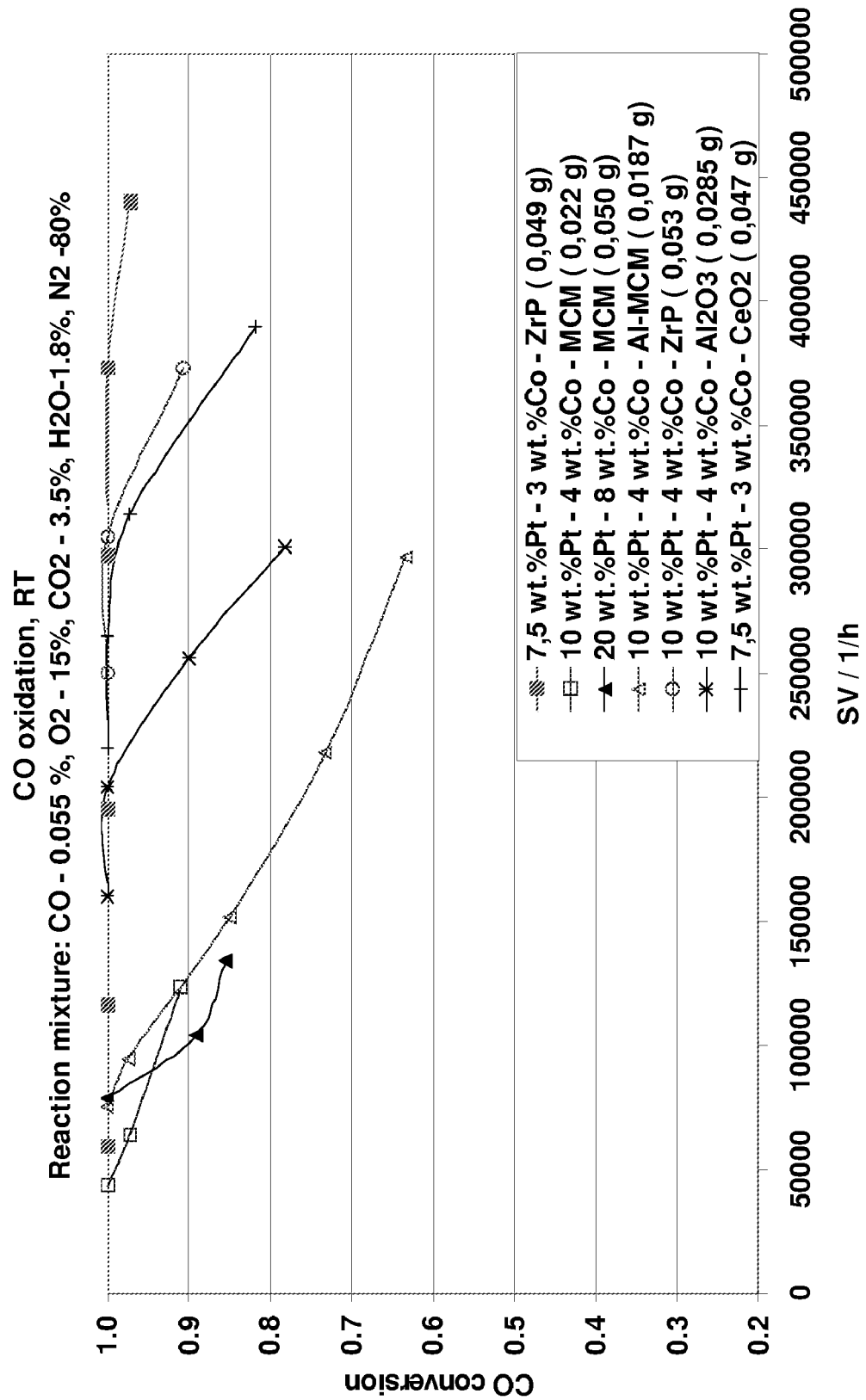
FIGS. 12a and 12b are graphs of the activities of various catalysts for the oxidation of CO at an ambient temperature (25° C.).
Figure 12B:
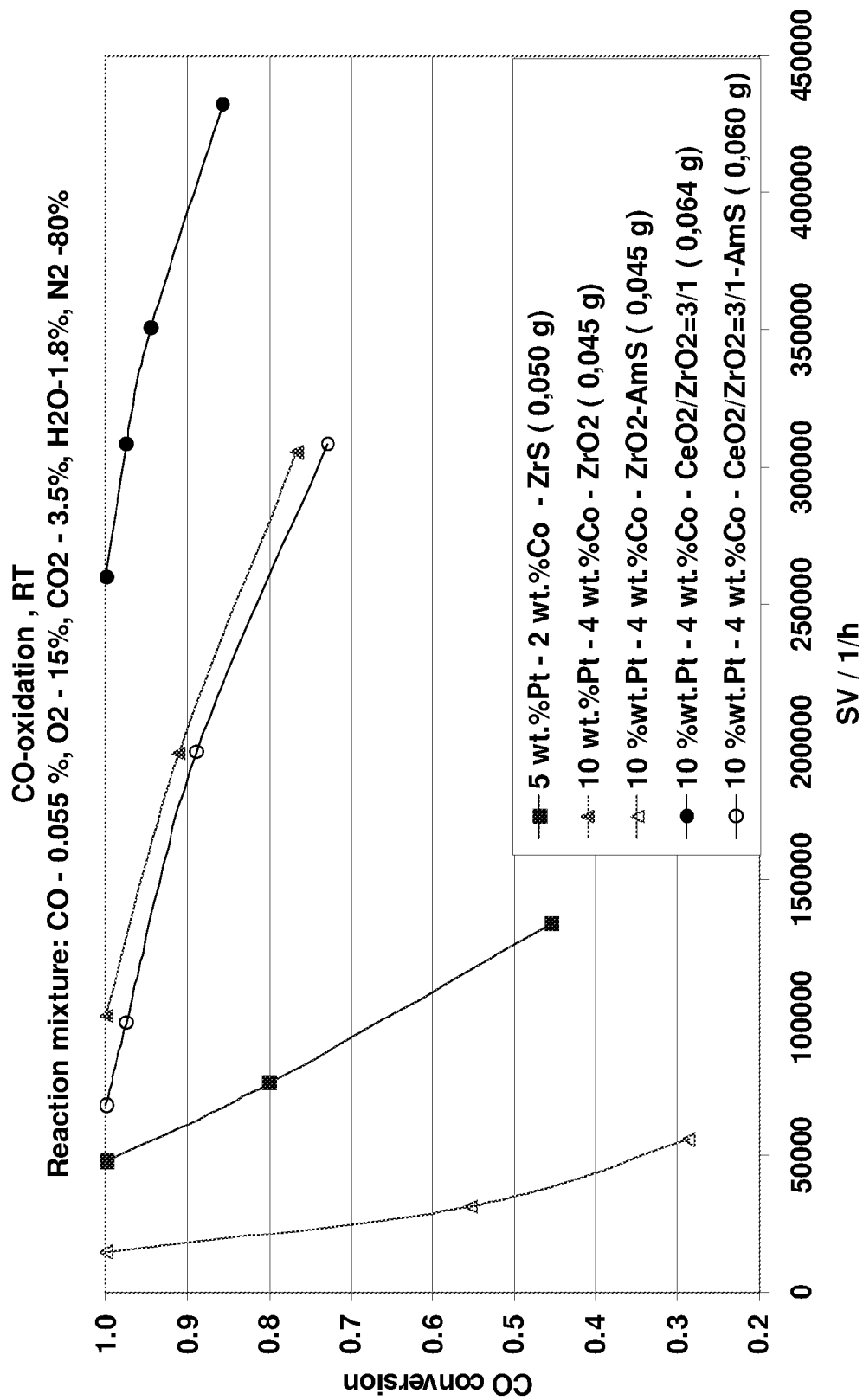

FIGS. 12a and 12b show, with the aid of a graph, the activities of various catalysts for the oxidation of CO at an ambient temperature (25° C.) under cold start conditions of a diesel engine. The abbreviations used here have the following meanings:

ZrS: sulfated zirconium dioxide; and

AmS: Addition of ammonium sulfate during the production of the catalyst.

Figure 13:
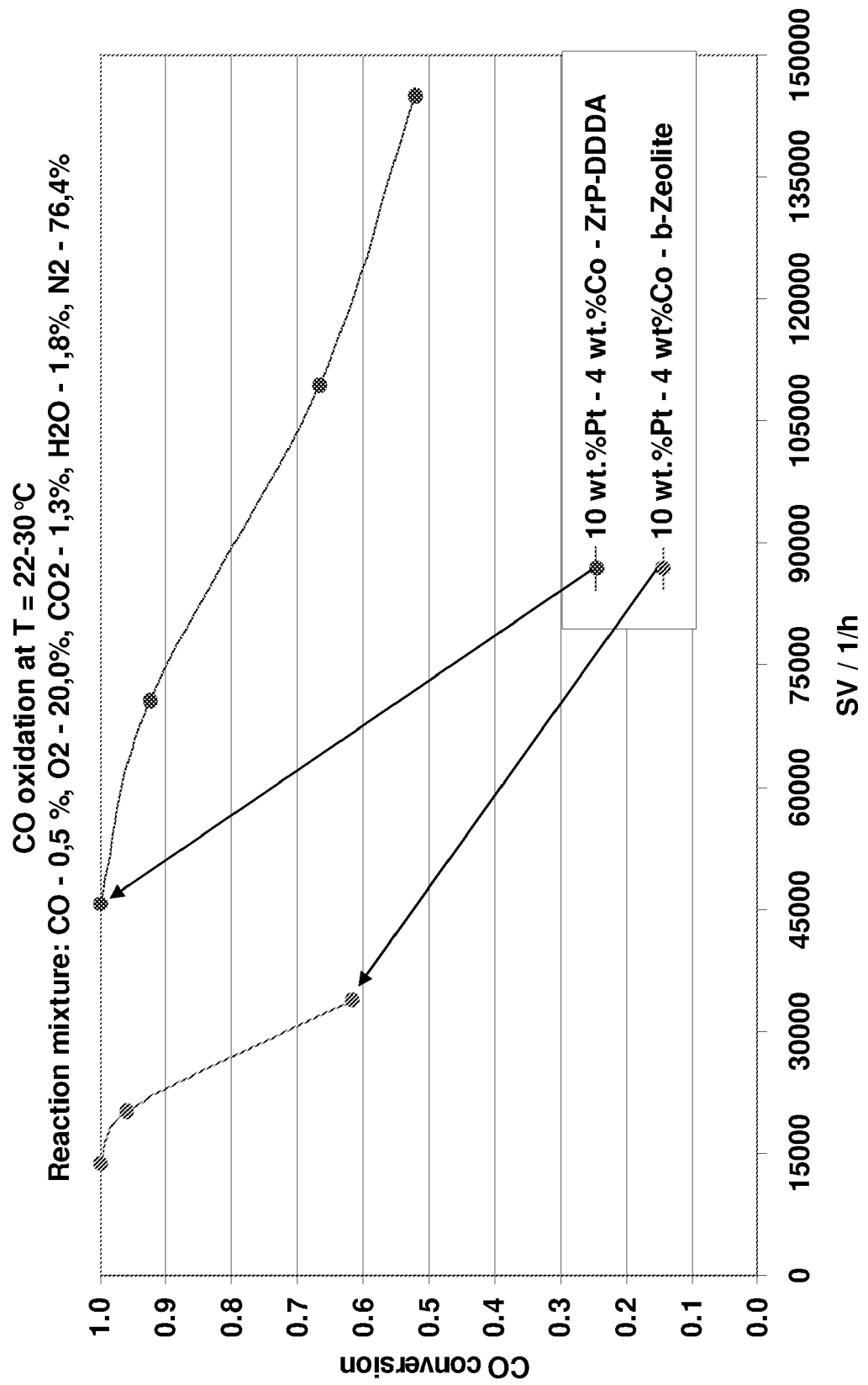
FIG. 13 is a graph of the activities of two catalyst systems for the oxidation of CO at an ambient temperature.

FIG. 13 shows the oxidation activity of CO for two catalyst systems at an ambient temperature under conditions that would be applicable, when the invention is used as a respiratory protection system.

COMPARATIVE EXAMPLE 1

Production of a Support Structure Comprising Silicon Dioxide of the MCM Type

The MCM material was produced by the method described in the article by K. Schumacher, M. Grün and K. K. Unger, Microporous and Mesoporous Materials, 27 (1999) 201-206. This process allows the production of MCM material at ambient temperatures without hydrothermal synthesis, as a result of the use of a medium comprising water and ethanol. N-Hexadecyltrimethylammonium bromide $C_{16}H_{33}(CH_3)_3NBr$ was dissolved in a mixture of water and ethanol and admixed with aqueous ammonia and, subsequently, tetraethoxysilane (TEOS). The following molar ratios of the constituents were used: 1M TEOS/12.5M $NH_4OH$/54M ethanol/0.4M hexadecyltrimethylammonium bromide/175M water. After stirring at the ambient temperature for two hours, the solid obtained was filtered, washed with water and dried in air at ambient temperature. The BET surface area of the sample was 1230 m²/g.

EXAMPLE 1

Production of Silicon Oxide of the MCM Type, According to the Present Invention

The MCM material was produced by a method analogous to Comparative Example 1, but using didecyldimethylammonium bromide $[CH_3(CH_2)_9]_2(CH_3)_2NBr$ (DDDA-Br), 75% by weight gel in water (Aldrich), in place of hexadecyltrimethylammonium bromide. A quantity of 16.9 g of DDDA-Br were dissolved in a solution comprising 125 ml of absolute ethanol and 90 ml of water. After stirring at ambient temperature for 30 minutes, 8% by weight of TEOS were added to the solution, while stirring intensively. After stirring for 5 minutes, 60 ml of a 25% strength ammonia solution were added to this solution, while stirring vigorously, with only partial precipitation occurring of a white precipitate. The gel formed was stirred overnight at ambient temperature, subsequently filtered off, and then dried at ambient temperature in a dry box. The DDDA-Br was removed by calcination at 500° C. for 6 hours. The BET surface area of the sample was 1860 m$^2$/g.

Samples of Zr-MCM and Al-MCM were produced in the same way, with zirconyl nitrate (molar ratio of Zr/Si=1:10) or aluminum nitrate (molar ratio of Al/Si=1:5) was added before the addition of TEOS.

COMPARATIVE EXAMPLE 2

Production of Zirconium Phosphate having a Large Surface Area

Zirconium phosphate was produced by the method described in the article by Yoshinaga, R. Ohnishi and T. Okuhara, Catalysis Letters, 94 No. 1-2, (2004), 45-47. Zirconyl chloride (1M) was mixed with a 1M solution of ammonium dihydrogenphosphate at a molar ratio of P/Zr of 2:1, while stirring vigorously, to give a precipitate of zirconium phosphate. The precipitate was filtered off, washed and dried at 100° C. The sample was calcined at 550° C. for 6 hours. The BET surface area of the sample was 0.7 m$^2$/g.

EXAMPLE 2

Production of Zirconium Phosphate having a Large Surface Area According to the Present Invention The zirconium phosphate was produced as in Comparative Example 2, with zirconyl acetate instead of zirconyl chloride being additionally used together with the addition of didecyldimethylammonium bromide (DDDA-Br), in order to avoid contamination of the catalyst with chloride ions. A quantity of 61.5% by weight of zirconyl acetate solution (15% by weight of Zr, Alfa Aesar) was mixed with 20.3 g of DDDA-Br (Aldrich) in 50 ml of water at ambient temperature, while stirring. Then 23 g of $H_2NH_4PO_4$ in 200 ml of water were subsequently added to this solution. After stirring overnight, the precipitate was filtered off, washed and dried at 100° C. It was subsequently calcined at 550° C. for 6 hours. The BET surface area of the sample was 475 m$^2$/g.

EXAMPLE 3

Production of the Pt-Co Catalyst on Various Oxides, According to the Present Invention The support structures produced in Examples 1 and 2 and in Comparative Examples 1 and 2 were impregnated with a warm solution (85° C.) comprising tetrammineplatinum(II) hydroxide or tetrammineplatinum(II) nitrate, cobalt nitrate, tartaric acid and/or citric acid and/or malic acid. The citric acid and/or tartaric acid were/was added in a slight excess of 1.2 (multiplied by the stoichiometric molar ratio of citric acid/Pt+Co=1). The loading with platinum and cobalt was varied in the range from 1 to 40% by weight, and from 0.5 to 30% by weight, respectively. The samples were dried overnight at 77° C. in a dry box and finally calcined at 550° C. in air for 2 hours.

EXAMPLE 4

Examination of the Catalysts

All catalysts were tested on the laboratory scale in a fixed-bed flow reactor made of a fused silica tube (1 cm ID×5 cm L). An electric oven was used to heat the reactor. The temperature was monitored by means of a thermocouple placed in the center of the catalyst bed.

A pulverized catalyst sample, having a catalyst loading that ranged from 10 to 500 mg, depending on the catalyst density, was diluted with 1 cm$^3$ of silica sand and then placed in the reactor: a feed gas mixture having the following composition was introduced: 0.6% by volume of CO, 0.9% by volume of $O_2$, 28.5% by volume of $H_2O$, 14.5% by volume of $CO_2$, 52% by volume of $H_2$, and 3.5% by volume of $N_2$. This methane reforming gas mixture, after the water gas shift reaction (WGSR), was used for the PROX. For the PROX test at low temperatures, the reaction mixture comprised 0.6% by volume of CO, 0.9% by volume of $O_2$, 18% by volume of $CO_2$, 3.5% by volume of $H_2O$ and 73.5% by volume of $H_2$ and 3.5% by volume of $N_2$. The mixture of 550 ppm (0.055% by volume) of CO, 15% by volume of $O_2$, 1.8% by volume of $H_2O$, 3.5% by volume of $CO_2$, with $N_2$ as balance, was used to simulate the diesel exhaust gas mixture for cold start conditions. For the tests for respiratory systems, a mixture of 0.5% by volume of CO, 20% by volume of $O_2$, 1.3% by volume of $CO_2$, 1.8% by volume of $H_2O$ in $N_2$ was produced and used.

A conventional flow-through setup was used to produce the gas mixture. All gases were used as high-purity gases. To set precise water concentrations in the gas line, an air humidifier was installed. The flow rates were controlled using a mass flow regulator (MKS, Munich, Germany). To avoid condensation of water, all connecting lines for the PROX test (apart from the PROX test at low temperatures) were installed in a heatable box, in which a constant temperature of 85° C. prevailed. The gases leaving the reactor were analyzed by means of an HP 6890A gas chromatograph, using Porapak Q and NaX capillary columns. Before the test, all catalysts for the PROX test were reduced in the reaction mixture at 165° C. for 15 minutes, followed by a cooling step.

The BET surface areas were measured by $N_2$ adsorption at 77K, using a Micromeritics 2010 ASAP apparatus. The XRD studies were carried out using a DRON 4 diffractometer with Cu-Kα radiation. The XRD patterns were recorded in the range 1-7° (2θ), with steps of 0.04° (2θ).

Building on the recognition that very good results were achieved using silicon oxide support structures, further optimizations in order to increase the activity and selectivity of the catalyst were carried out on these.

The Pt/Co ratio at a constant Pt loading of 2% by weight was first examined (FIG. 2). The best activity and highest selectivity for the oxidation of CO were found at a Pt/Co weight ratio in the range from 1:2 to 4:1. Further improvements were found in the range from 2:1 to 3:1, in particular 2.5:1, which corresponds to a Pt/Co molar ratio of 0.75:1. Higher loadings with cobalt and thus a higher Co/Pt ratio lowered the activity, as can be seen from FIG. 3b.

With regard to the loading of the catalyst with platinum and cobalt, it was found that loading with ranges from 5 to 10% by weight of platinum at a Pt/Co weight ratio of 2.5:1 gives the best results for the catalyst, when using a support structure comprising silicon oxide (FIG. 3a). However, there is a strong dependence of the temperature window on the loading with platinum and cobalt here. Although a higher loading leads to lower temperatures for the complete removal of CO, the upper temperature limit for the complete removal of CO is reduced. An increase in the Pt loading to more than 10% by weight barely influences the activity, while the upper temperature limit for the complete removal of CO is significantly reduced. This results in a very narrow temperature window for the complete removal of CO under PROX conditions.

Catalysts having an optimal Pt loading of from 5 to 10% by weight are naturally more expensive to produce than customary catalysts that contain from 0.5 to 2% by weight of platinum, but these catalysts can again be used very effectively at very high space velocities. These can thus be more economically feasible than catalysts with a lower Pt loading because the catalyst weight is very low, due to the effective removal of CO at high space velocities. For example, the amounts of platinum and the costs of the catalyst are the same when a catalyst containing 10% by weight of platinum is operated at a space velocity of 200,000 $h^{-1}$, and when a catalyst containing 2% by weight of platinum is operated at a space velocity of 40,000 $h^{-1}$.

A further optimization method relates to the choice of the medium in which the co-impregnation is carried out. Thus, experiments in which an acidic medium in this case, dilute nitric acid was used were first performed. The activity found here is shown in FIG. 4. A high activity was measured even below 100° C. under extremely high gas flow rates and at high space velocities of 200,000 $h^{-1}$. The examination of such catalysts with high activity proved to be a problem, when using a customary PROX mixture of 0.6% by volume of CO, 0.9% by volume of $O_2$, 28.5% by volume of $H_2O$, 14.5% by volume of $CO_2$, 52% by volume of $H_2$ and 3.5% by volume of $N_2$ because of the condensation of water below 80° C. A mixture comprising 0.6% by volume of CO, 0.9% by volume of $O_2$, 18% by volume of $CO_2$, 3.5% by volume of $H_2O$, 73.5% by volume of $H_2$ and 3.5% by volume of $N_2$ was therefore used for the PROX test at low temperatures. This mixture comprised water (saturated with water vapor at 27° C.). The reaction conditions were thus more difficult than in customary PROX experiments, since the mixture used contained more $CO_2$ and $H_2$ but less water. Water usually activates the platinum-containing catalysts in the oxidation of CO, while $CO_2$ and $H_2$ have a negative effect on the activity.

The various production methods for a platinum loading of 10% by weight and a cobalt loading of 4% by weight on an $SiO_2$ support structure are shown in FIG. 5. The investigation was carried out using a PROX mixture at low temperatures. Here, it can be established that the activity depends greatly on the production method. When the order of deposition of the catalyst precursor is varied, it was found that simultaneous deposition of platinum and cobalt is preferable.

Surprisingly, it has been found that the activity of the catalyst depends greatly on the nature of the medium used for the co-impregnation. Thus, it was found that catalysts which, according to the prior art, are used in neutral or basic medium displayed only a low level of effectiveness. On the other hand, the acidic medium used according to the invention was able to give significantly higher activities.

A further improvement can be achieved by using a solution containing citric acid as the acidic medium. Citric acid not only serves to adjust the pH, but also prevents the precipitation of Pt and Co ions on the surface of the silicon oxide, as a result of the protons of the citric acid competing for the adsorption sites on the surface. The separate deposition of platinum and cobalt is thus prevented, which is of great importance, since a high activity requires good contact between platinum and cobalt. Thus, complete oxidation of CO is only observed for platinum without cobalt at temperatures above 180° C., even under otherwise optimal conditions. Furthermore, citric acid is a good complexing agent, making possible high dispersion of both platinum and, in particular, cobalt, and leads to good contact between the two components. Likewise, reduction of platinum and cobalt occurs at low temperatures above 150° C. when using citric acid, so that prior reduction by carbon monoxide or hydrogen or preferably in the reaction mixture is not necessary in order to improve the activity, owing to the reduction of the catalyst during its production and calcination.

The catalyst was treated experimentally with acids other than citric acid, for example, tartaric acid and malic acid. It was found that the Pt-Co catalyst (5% by weight of Pt and 2% by weight of Co) has the highest activity when using tartaric acid. The temperature range for complete CO conversion over the catalyst is from 50° C. to 175° C. Experiments have shown that the catalyst treated with formic acid displayed a significantly lower activity. At a higher noble metal content (10% by weight of Pt and 4% by weight of Co), the choice of acid had no significant influence on the CO conversion. When tartaric acid is used, the Pt content can be reduced significantly.

It could thus be established that co-impregnation with Pt and Co precursors, in particular tetrammineplatinum(II) nitrate or tetrammineplatinum(II) hydroxide and cobalt nitrate, in the presence of tartaric and/or citric acid result in high activity and high selectivity in the oxidation of CO.

A further optimization relates to the choice of the support structure. Thus, it was found that the activity at low temperatures of the catalyst system Pt-Co/$SiO_2$ using silica gel with a surface area of 520 $m^2$/g, could not be improved further. Higher loadings with platinum and cobalt lead only to a narrower temperature window for this system, since the activity at low temperatures is not significantly increased, while the upper temperature for the complete removal of CO is significantly reduced, as can be seen from FIG. 3a.

Large surface mesoporous structures of the MCM type were tested. Such mesoporous molecular sieves have large surface areas, with BET surface areas of up to 1500-1600 $m^2$/g. Various samples of MCM support structures were produced using simple and advantageous methods at ambient temperatures, as described in K. Schumacher, M. Grün and K. K. Unger, Microporous and Mesoporous Materials, 27 (1999) 201-206. BET surface areas of the MCM material of up to 1150-1230 $m^2$/g were therefore able to be achieved. According to the invention, these processes were then modified by using didecyldimethylammonium bromide (DDDA-Br), instead of hexadecyltrimethylammonium bromide (cetyltrimethylammonium bromide, CTMA-Br). The surfactant DDDA-Br contains two relatively short hydrocarbon chains instead of one long chain, as in the case of CTMA-Br. This enabled the surface area to be increased greatly, and a BET surface area in the range from 1640-1860 $m^2$/g, depending on the molar ratio of silicon to surfactant, was achieved. This molar ratio was varied in the range from 0.1 to 1.2, with the highest BET value of 1860 $m^2$/g found for a DDDA-Br/Si ratio of 0.8. These BET values are significantly higher than the values reported hitherto for support structures of MCM type or other inorganic support structures, and they come very close to the surface area values for activated carbon, which has the largest known surface areas of up to 2500 $m^2$/g.

XRD analysis reveals that the phase having the greatest order was found for a DDDA-Br/Si ratio of 0.8, as can be seen from FIG. 6, so this ratio was used as a basis for further production tests. Further surfactants having two relatively long hydrocarbon chains, e.g., didodecyldimethyl-ammonium bromide and dihexadecyldimethylammonium bromide were examined. However, it was found that these resulted in a smaller surface area. A further disadvantage is the very high costs compared to DDDA-Br, while the inexpensive technical-grade 75% gel in water (Aldrich) can be used for DDDA-Br.

The MCM material with the greatest surface area of 1860 $m^2$/g was utilized for further optimization experiments. As can be seen from FIG. 7, a significantly higher activity and selectivity could be achieved for the MCM material when completing the process using citric acid, while other processes were far less effective. Optimization, with respect to the citric acid, indicated that the best molar ratio of citric acid to total loading (platinum and cobalt) is about 1.2:1. After production of a system of this molar ratio, the catalyst displayed complete removal of CO even at 50° C. and extremely high space velocities of 200,000 h$^{-1}$ under PROX conditions. Furthermore, the Pt-Co/MCM catalyst was optimized with respect to the loading with platinum (FIG. 3b). It can be seen from this that an MCM support structure with a low Pt-Co loading gives no advantages. This can be attributed to the fact that it is difficult to achieve good contact between platinum and cobalt at low loadings because of the extremely large surface area of the support structure. In addition, the lower density of MCM structures compared to commercial silicon oxide leads to a lower actual Pt loading at the same Pt-Co loading and the same space velocities, since the weight of the MCM structures was smaller by a factor of virtually 2, thus, the amount of platinum also decreased.

The abovementioned high space velocities of 200,000 h$^{-1}$ were not observed for any commercial silicon system, regardless of the loading with platinum and cobalt, which represents a considerable improvement compared to commercial silicon oxide. A further significant advantage of the Pt-Co catalyst on an MCM support is the wide temperature window for the complete removal of CO, due to the high activity at low temperatures and the low activity with regard to the oxidation of hydrogen. Thus, a higher temperature for the complete removal of CO can be achieved. This can range up to 170° C. even for very high Pt-Co loadings of 20% by weight of platinum and 6.7% by weight of cobalt. This can be attributed to the large surface area of MCM, which leads to the high dispersion of platinum and cobalt, even at high loadings. It can thus be established that the Pt-Co catalyst on an MCM support structure is the most promising candidate for the elimination of CO in the field of fuel cell applications. The fuel cell varies the temperature from 200° C. (typical temperature of the reformed gas from the WGSR at low temperature) to 80° C. (lowest temperature without appreciable condensation of water), while the operating temperature of fuel cells usually ranges from 50 to 80° C. The working range of a PROX catalyst should therefore be in the range from 50 to 200° C. The system Pt-Co/MCM with a BET surface area of 1860 m$^2$/g and from 5 to 10% by weight of Pt and from 2 to 4% by weight of Co, covers all temperatures and space velocities for all possible PROX applications in fuel cells. This can be attributed to the high BET surface area, which allows high dispersion of platinum to be achieved and the formation of large Pt clusters with more metallic properties, leading to the oxidation of hydrogen, to be avoided. Furthermore, MCM support structures have an increased acidity, which aids the removal of CO$_2$. However, it was not possible to work at temperatures lower than 50° C. for the catalyst based on platinum, cobalt and an MCM support structure because of the liberation of heat from the oxidation of CO and H$_2$.

A further variant relates to the use of zirconium-based support structures. Zirconium oxide displays a good activity, but has a small temperature window, which is attributable essentially to the small surface area. In addition, zirconium oxide does not only possess strongly acid sites, but also basic sites that are not very suitable for the oxidation of CO because the removal of carbonates at the basic sites, which are formed from the surface of the catalyst during the course of the oxidation of CO, is not simple. It is therefore proposed according to the invention, that strongly acidic zirconium-containing compounds in particular, zirconium phosphate and sulfated zirconium oxide be used.

Experiments on the preparation of zirconium oxide with a large surface area using the same method of employing DDDA-Br as MCM support structures were unsuccessful, since the structures collapse and have surface areas of less than 20 m$^2$/g.

Support structures comprising zirconium phosphate with large surface areas could likewise be prepared, with CTMA-Cl or DDDA-Br employed as surfactants.

Building on the process devised by Y. Kamiya, S. Sakata, Y. Yoshinaga, R. Ohnishi and T. Okuhara, Catalysis Letters, 94 No. 1-2, (2004), 45-47, which is based on the preparation of zirconium phosphate with a Zr/P molar ratio of 1:2 and a surface area of 120 m$^2$/g after calcination at 400° C., this was repeated using zirconium oxide chloride and ammonium dihydrogenphosphate. The structures formed here collapse after calcination at 550° C. and lead to surface areas of less than 1 m$^2$/g.

The same synthesis was then carried out with the addition of surfactants, i.e., CTMA-Cl and DDDA-Br, at a molar ratio of Zr/P/surfactant of 2:1:1. This surprisingly gave a very stable structure, having a surface area of 433 and 475 m$^2$/g after calcination at 550° C. XRD analysis indicated the presence of a mesoporous structure, as can be seen from FIG. 8. This structure has a weak order. The order was not able to be increased by hydrothermal treatment at 100° C. in the mother liquor for three days, although the surface area was significantly reduced to 210 m$^2$/g, thus, this treatment is not promising.

The support structures based on zirconium phosphate were used for the Pt-Co/zirconium phosphate catalysts. The data on the activity of the catalysts produced using tetrammine-platinum(II) nitrate, cobalt nitrate and citric acid under PROX conditions are shown in FIG. 9. Both systems i.e., those using CTMA-Cl or DDDA-Br as surfactants display excellent activity with complete removal of CO, even at 50° C. for the catalyst treated with DDDA-Br and at approximately 70° C. for the catalyst treated with CTMA-Cl. Both systems have a wide temperature window for the complete elimination of CO. A catalyst based only on platinum, which had been produced by the same process using citric acid, is far less active, as can be seen from FIG. 9. This leads to the conclusion that the high activity is attributable to the interaction of platinum and cobalt. The catalyst described was very active, even at space velocities of 400,000 h$^{-1}$.

Sulfated zirconium dioxide cannot be produced by the same method as zirconium phosphate, because as zirconium sulfate is not precipitated under the same conditions as zirconium phosphate. Ammonia was therefore additionally used in order to precipitate sulfated zirconium hydroxide. This was then calcined at 550° C., with this temperature not being sufficient for the removal of sulfates from the catalyst. As a result, the surface area is significantly lower, namely only 70 m$^2$/g. The catalyst system of platinum and cobalt on sulfated zirconium dioxide was nevertheless able to achieve good properties with regard to the oxidation of CO under PROX conditions, as demonstrated in FIG. 11. At a loading of 10% by weight of Pt, the temperature window was, however, small because of the low surface area, while the system comprising 5% by weight of Pt, 2% by weight of Co and sulfated zirconium dioxide exhibited better properties. This strong activity of Pt-Co on sulfated zirconium dioxide was surprising, as it is generally known that sulfur compounds act as catalyst poisons for Pt catalysts in many reactions, including the oxidation of CO.

In a further step, Pt-Co catalysts on different support structures were compared with one another under PROX conditions. The BET surface areas of the various support structures are shown in Table 1.

TABLE 1

| Support structure | Calcination temperature $T_{cal}$, °C. | BET surface area, m²/g |
|---|---|---|
| $SiO_2$ | 550 | 520 |
| $Al_2O_3$ | 550 | 242 |
| MCM-$SiO_2$ (according to the invention) | 550 | 1860 |
| zirconium phosphate (according to the invention) | 550 | 475 |
| $CeO_2$ | 600 | 116 |
| $ZrO_2$ | 375 | 173 |
| $CeO_2$—$ZrO_2$ (Ce/Zr 3:1) | 375 | 121 |
| $TiO_2$ | 375 | 152 |
| Sulfated zirconium oxide | 550 | 70 |
| Zr-MCM (Si/Zr = 10:1) | 550 | 801 |
| Al-MCM (Si/Al = 5:1) | 550 | 567 |

It can be seen from FIGS. 10a, 10b and 11 that the most effective Pt-Co catalyst is based on support structures composed of zirconium phosphate or silicon dioxide of the MCM type, with both produced by the process of the invention using DDDA-Br. Pt-Co catalysts on cerium dioxide/zirconium dioxide and aluminum oxide also achieved complete removal of CO, even at temperatures ranging from 50 to 60° C. The further Pt-Co catalysts that are based on other oxides as support structures displayed lower but nevertheless good activity, particularly in the cases of cerium dioxide, silicon dioxide and zirconium dioxide.

An examination of the influence of the replacement of silicon in MCM by aluminum and zirconium is shown in FIG. 11. It is apparent here that a lower activity was achieved than in the cases of MCM support structures based solely on silicon, but it has to be taken into account that Al-MCM and in particular, Zr-MCM have very low densities; this can be attributed to the fact that the amounts of platinum and cobalt for a Zr-MCM are smaller by a factor of 2.5, compared to an MCM based only on silicon. If, on the other hand, the same amounts of platinum and cobalt are used with a higher loading of the catalyst, the activity comes very close to this, as can be seen in FIG. 10b.

The co-impregnation of Pt and Co precursors in the presence of citric acid can be applied to any support structure known from the prior art, with the type of support structure able to influence the activity. Thus, for example, the activity of a Pt-Co catalyst on a support structure comprising titanium dioxide is significantly lower, as can be seen in FIG. 10a, which is attributable to strong Pt interactions with the support structure. The complete removal of CO at the lowest temperatures examined, 50° C., was observed only for zirconium phosphate, silicon dioxide of the MCM type, and cerium dioxide/zirconium dioxide.

It was not possible to achieve temperatures below 50-60° C. under PROX conditions at low temperatures because the liberation of heat in the oxidation of CO and $H_2$ is too high. Further studies were carried out at ambient temperatures in order to determine whether activity is still present at these temperatures. The results of these studies can be seen in FIGS. 12a, 12b and 13. Two different reaction mixtures were used, with one simulating the cold start conditions in a motor vehicle with typical concentrations of the main component in the diesel exhaust gas under ideal conditions, i.e., CO, $O_2$, $CO_2$ and water (saturated water vapor at 17° C.). The second mixture simulated a possible reaction mixture for respiratory protection systems, e.g., for firemen, with relatively high CO and $CO_2$ concentrations under fire conditions.

It can be seen from FIG. 12a that some catalysts display conspicuous activity at ambient temperatures in the presence of water and $CO_2$, using the mixture that imitates cold start conditions for these engines. The highest effectiveness is shown by a Pt-Co catalyst on a support structure comprising zirconium phosphate, with the complete removal of CO up to extremely high space velocities of 375,000 $h^{-1}$. Strong activity was also found for Pt-Co catalysts on cerium dioxide and cerium dioxide/zirconium dioxide (complete removal of CO up to 250,000 $h^{-1}$, aluminum oxide (up to 200,000 $h^{-1}$) and zirconium dioxide (100,000 $h^{-1}$). Pt-Co catalysts on an MCM support structure were less effective, even at a high loading with platinum and cobalt, though partial replacement by aluminum (Al-MCM) slightly increased the activity.

The high activities found here make possible the use of such types of catalysts very promising for applications in the motor vehicle sector in order to solve the cold start problem, since 80 to 85% of CO emissions rise here, when starting at temperatures below 100° C. Taking into account the expected sulfation of catalysts for diesel applications, the Pt-Co catalyst on zirconium phosphate is most promising because zirconium sulfate cannot be sulfated. After in-situ sulfation of Pt-Co on cerium dioxide/zirconium dioxide, it was found that strong activity for the oxidation of CO at ambient temperatures is still retained after sulfation (approximately 65,000 $h^{-1}$ at complete removal of CO) (FIG. 12b). On the other hand, zirconium dioxide was more strongly deactivated.

The complete elimination of CO in the presence of water and $CO_2$ at extremely high space velocities, and the resistance to poisoning by sulfur also makes it possible to use such catalysts for interior space air purification systems in tunnels, multi-story car parks, underground railways, etc., as high space velocities are necessary here for air circulation and ventilation.

The results of the catalyst tests for the reaction mixture, which simulates respiratory protection systems, are shown in FIG. 13. The system with the highest activity (Pt-Co zirconium phosphate) and a system based on a β-zeolite with deposited Pt-Co were examined, taking account of the fact that a zeolite can absorb many other toxic compounds that are, for example, liberated during a fire. The activities at the same space velocities were in this case lower compared to the diesel cold start conditions owing to the CO concentration, which was about an order of magnitude higher. Nevertheless, complete CO conversion was found up to a space velocity of 45,000 $h^{-1}$ for Pt-Co zirconium phosphate and up to 12 000 $h^{-1}$ for Pt-Co/β-zeolite. These activities are more than sufficient for an application in which high space velocities are required. It was difficult to maintain the same temperature during the experiment because of the liberation of heat, so the temperatures rose at high space velocities.

With regard to the thermal stability, it is found that the activity at ambient temperature does not change for the catalyst based on Pt-Co/zirconium oxide after calcination at 600° C., which is completely adequate for most applications.

All the above-mentioned temperatures are measured in the catalyst bed. Numerous modifications and variations of the present invention are possible, in light of the above teachings. It is therefore to be understood that within the scope of the appended claims, the invention may be practiced otherwise than as specifically described herein.

What is claimed:

1. A respiratory protection system comprising:
 a preferential CO oxidation catalyst comprising platinum and cobalt, and having a Pt/Co ratio at a constant Pt loading of between 1:2 to 4:1 percent by weight; and
 a support structure of β-zeolite.

2. A respiratory protection system comprising:
 a preferential CO oxidation catalyst comprising platinum and cobalt, and having a Pt/Co ratio at a constant Pt loading of between 1:2 to 4:1 percent by weight; and
 a support structure of zirconium phosphate.

* * * * *